United States Patent [19]
Fleischer et al.

[11] 3,834,770
[45] Sept. 10, 1974

[54] SAFETY ARRANGEMENT FOR PROTECTING AGAINST THE LOCKING OF WHEELS IN MOTOR VEHICLES

[75] Inventors: Helmut Fleischer; Eberhard Schnaibel, both of Stuttgart; Helmut Domann, Leonberg, all of Germany

[73] Assignee: Robert Bosch GmbH, Stuttgart, Germany

[22] Filed: Nov. 17, 1971

[21] Appl. No.: 199,580

[30] Foreign Application Priority Data
Nov. 18, 1970 Germany............................ 2056621

[52] U.S. Cl............... 303/21 P, 303/20, 303/21 BE
[51] Int. Cl.............................................. B60t 8/08
[58] Field of Search ................. 188/181; 303/20, 21; 324/160–162; 340/52 R, 262–263

[56] References Cited
UNITED STATES PATENTS

| | | | |
|---|---|---|---|
| 3,401,984 | 9/1968 | Williams et al................ | 303/21 BE |
| 3,467,443 | 9/1969 | Okamoto et al................ | 303/21 BE |
| 3,469,662 | 9/1969 | Dewar............................ | 303/21 CG |
| 3,494,671 | 2/1970 | Slavin et al.................... | 303/21 P |
| 3,524,685 | 8/1970 | Harned et al.................. | 303/21 BE |
| 3,640,589 | 2/1972 | Taniguchi...................... | 303/21 BE |
| 3,642,329 | 2/1972 | Zechnall et al................ | 303/21 BE |
| 3,650,575 | 3/1972 | Okamoto...................... | 788/181 C X |
| 3,671,083 | 6/1972 | Matsumura.................... | 303/21 BE |
| 3,672,730 | 6/1972 | Burckhardt et al............ | 303/21 P X |

Primary Examiner—Trygve M. Blix
Assistant Examiner—Stephen G. Kunin
Attorney, Agent, or Firm—Michael S. Striker

[57] ABSTRACT

An arrangement for safely protecting against the stoppage of a wheel while driving on a road surface in a vehicle. A signal generator provides an electrical alternating current signal having a frequency proportional to the angular velocity of a wheel of the vehicle. A low pass filter connected to the output of the signal generator converts the alternating current signal into a first DC signal having a magnitude which varies in accordance with variations in the frequency of the alternating current signal. A pressure reducing valve connected in the braking line is used to regulate the intensity of the braking by being operated through an amplifier which, in turn, is connected to a comparator. An integrator in the comparator provides a second DC signal which depends on the angular velocity of a wheel of the vehicle. A threshold switch also within the comparator is connected to the integrator and receives the second DC signal.

10 Claims, 13 Drawing Figures

INVENTORS
Helmut FLEISCHER
Eberhard SCHNAIBEL
Helmut DOMANN
BY
their ATTORNEY

FIG. 10

SAFETY ARRANGEMENT FOR PROTECTING AGAINST THE LOCKING OF WHEELS IN MOTOR VEHICLES

BACKGROUND OF THE INVENTION

The present invention relates to a control circuit for a blocking protection arrangement which acts upon at least one wheel of a motor vehicle. A pulse generator which provides an electrical alternating voltage signal, is connected with a first low pass filter. The alternating current voltage has a frequency proportional to the angular speed of the wheel. The low pass filter converts the alternating voltage signal into a first DC voltage signal having a magnitude which varies with frequency variations. A pressure reducing valve is connected in the braking line, and is controlled by an ampifier.

In arrangements for protecting against the blocking or locking of wheels in motor vehicle braking installations it is known in the art to measure the angular speed of a wheel by providing a pulse generator in conjunction with each wheel. In the conventional protection arrangements, the pressure in the brake line becomes reduced, when the measured angular rotational speed obtained from the pulse generator is suddenly severely reduced. It is obtained thereby, that the wheel brake becomes again released before the wheel is fully stopped from rotating. After release of the brake, the wheel becomes again accelerated. As soon as this acceleration of the wheel exceeds a predetermined value, the pressure reducing valve becomes again closed and the braking pressure becomes thereby increased.

The conventional protection arrangements operate satisfactorily in most cases, and prevent the blocking or locking of a wheel. On wet and slippery road surfaces, however, it is possible that upon subsequent release of the brake only a relatively small positive wheel acceleration takes place. The control circuit for the pressure reducing valve must, therefore, be set so that the pressure reducing valve becomes again closed when very small positive accelerations already prevail. Only after a short acceleration interval, are the brakes again applied. When the wheel becomes thus again severely decelerated and only slightly accelerated, the wheel arrives at a standstill after only a few of such controlling cycles. For example, it is possible that when a vehicle having a velocity of 80 km/h becomes braked, the blocking protection arrangement is effective only to a velocity of 60 km/h. Below this speed of 60 km/h, the wheel is fully stopped or blocked. With these prevailing conditions in the conventional devices, the blocking protection arrangement cannot fulfill its purpose.

SUMMARY OF THE INVENTION

It is an object of the present invention to provide a control circuit for an arrangement to protect against the blocking of wheels, which prevents premature stoppage of a wheel of a vehicle even when the driving road surface is not in satisfactory condition.

Another object of the present invention is to provide the control circuit as set forth, which prevents the premature stoppage of a wheel of a vehicle with reliability and assurance.

A further object of the present invention is to provide the control circuit of the foregoing character which is simple in design and may be readily fabricated.

A still further object of the present invention is to provide the aforementioned control circuit which is reliable in operation and has a long operating life.

The objects of the present invention are achieved by providing that an electronic comparator is arranged between a low pass filter and an amplifier. The comparator includes at least one threshold switch and an integrating stage. The integrating stage provides, at its output, the second DC voltage signal which depends upon the angular speed of at least one of the wheels of the vehicle. This DC voltage from the integrating stage is then applied to the input of one individual threshold switch.

Many design possibilities are available for interconnecting the integrating stage with the threshold switch. A particularly simple solution, however, is obtained in the further embodiments of the present invention, when the electronic comparator includes a single threshold switch at its output side. An adding stage is, in this design, connected in front of this single threshold switch. A first input of the adding stage is connected to the output of a first low pass filter, and the second input of this adding stage is connected to a vehicle velocity simulating stage. The first low pass filter and the blocking protection arrangement are connected to the inputs of the vehicle velocity simulating stage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
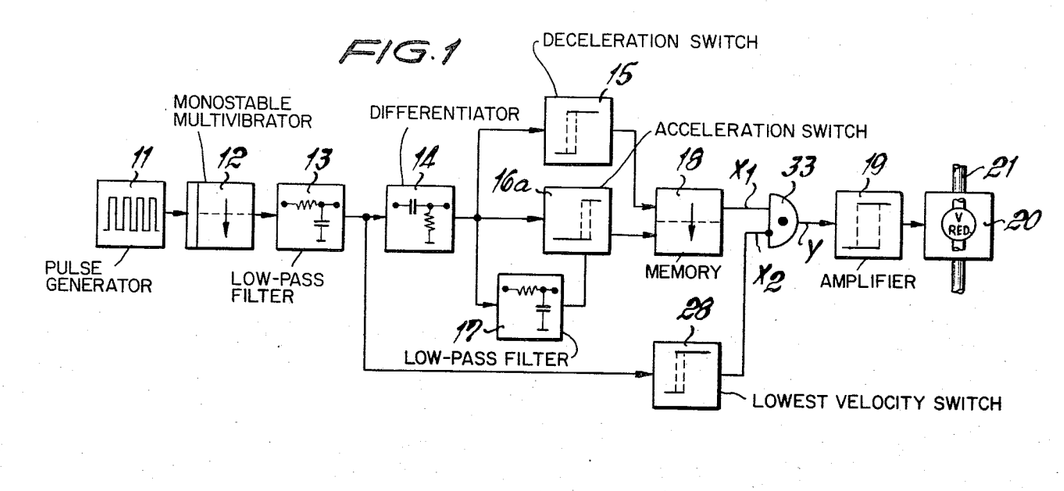
FIG. 1 is a block diagram of a first embodiment of the present invention.

Referring to the drawing, and in particular to FIG. 1, a pulse generator 11 is connected to the wheel of a motor vehicle, not shown. The output of the pulse generator 11 is connected to a series circuit including a monostable switching stage 12, a low pass filter 13 and a differentiator 14. Connected to the output of the differentiator 14 are the inputs of two threshold switching circuits 15, and 16a as well as the input of a second low pass filter 17. The output of the second low pass filter 17 is connected with a second input of the second threshold switch 16a. This second input serves for the purpose of setting the threshold level. The outputs of the two threshold switches 15 and 16a are connected to two inputs of a memory or storage stage 18, the output of which is connected to an amplifier 19, through an AND gate 33. Connected to the second input $x_2$ of the AND gate 33, is a switching stage 28 having an input connected with the first low pass filter 13. The amplifier 19 controls a pressure reducing valve 20 which is connected in the braking line 21.

Figure 1A:
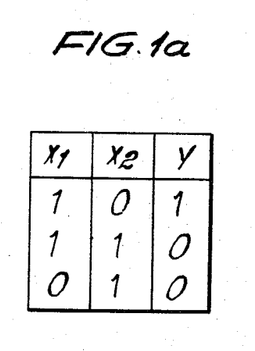
FIG. 1a is a truth table for an AND gate used in the embodiment of FIG. 1.
Figure 4:
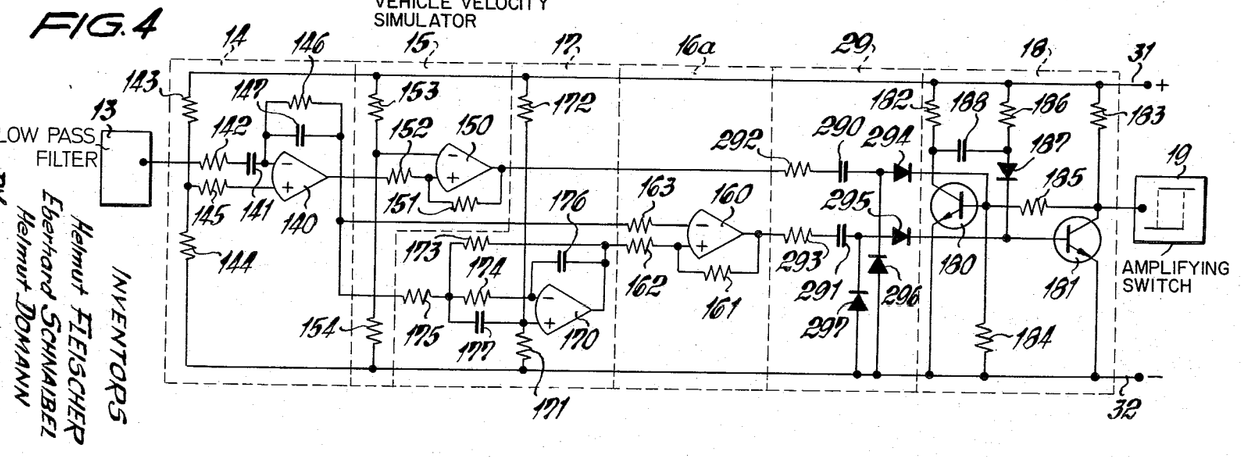
FIG. 4 is a circuit diagram of a portion of the first embodiment.
Figure 5:
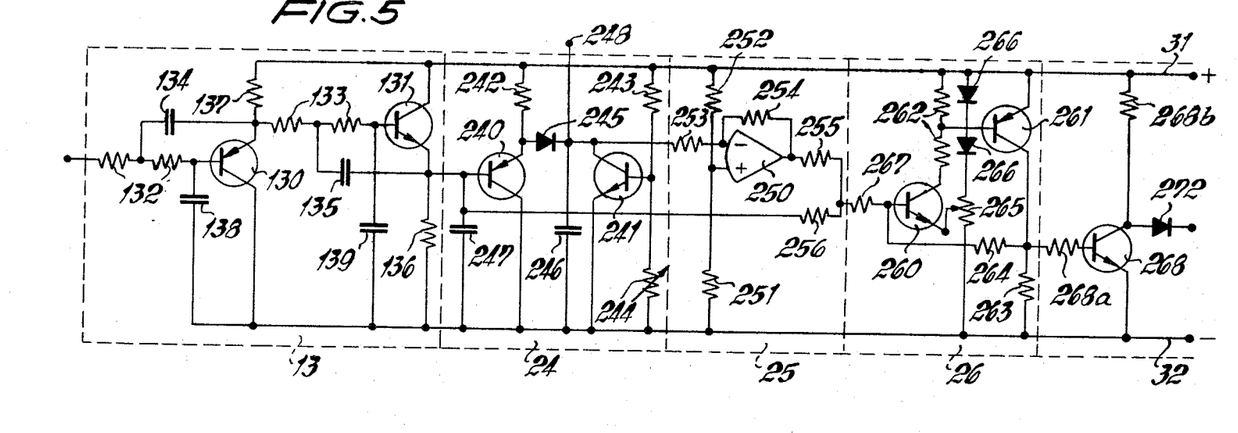
FIG. 5 is a circuit diagram of a portion of the second embodiment of the present invention.
Figure 6:
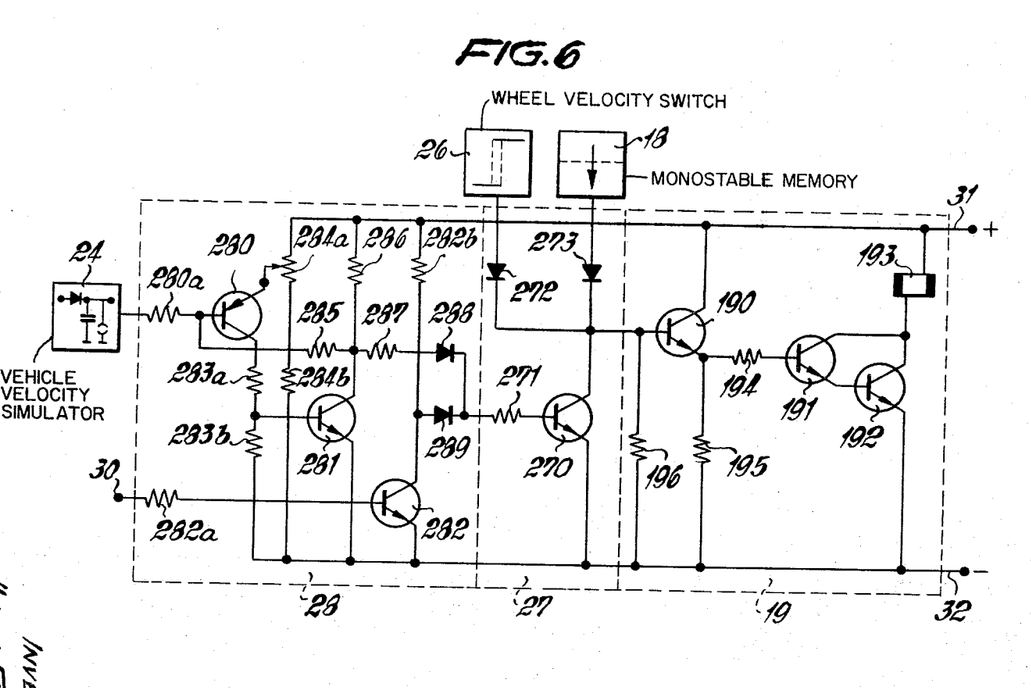
FIG. 6 is a circuit diagram of a part of the third embodiment of the present invention.

Conventional construction and design can be used for the pulse generator 11 and the pressure reducing valve 20. Similarly, numerous different variations in design are possible for the monostable switching stage 12. The circuit details for the stages 14, 15, 16a, 17 and 18 are shown in FIG. 4. The circuit diagram for the first low pass filter 13 is shown in FIG. 5, and the circuit diagram for the amplifier 19 and the switching stage 28, are illustrated in FIG. 6. The truth table for the AND gate 33 is shown in FIG. 1a. It may be seen from this table which signal appears at the output $y$ when the different signals are applied to the input $x_1$ and $y_1$.

Figure 2:
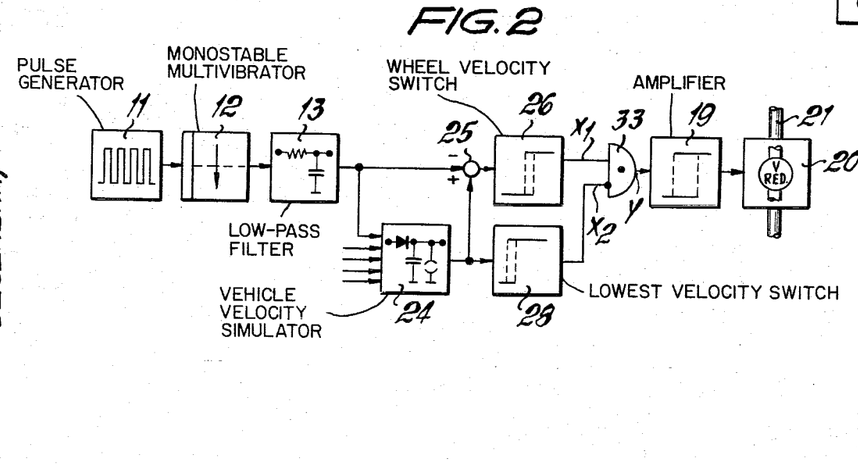
FIG. 2 is a block diagram of a second embodiment of the present invention.
Figure 5A:
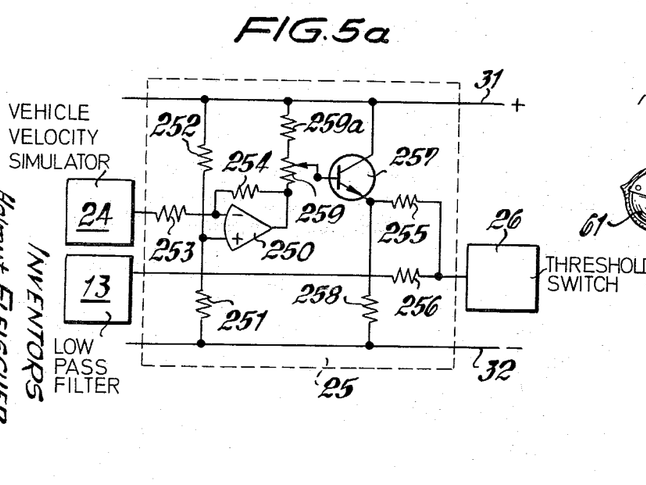
FIG. 5a is a modification of the circuit shown in FIG. 5.

The second embodiment in accordance with FIG. 2 includes an input circuit, as in the first embodiment, which has a series circuit including the pulse generator 11, the monostable switching stage 12 and the first low pass filter 13. The output of the first low pass filter 13 is connected directly with a first input of a subtracting stage 25, and at the same time, this output of the low pass filter 13 is also connected to a second input of the stage 25, through a vehicle velocity simulating stage 24. The output of the stage 25 is connected with the input of a threshold switch 26, which is referred to as the third threshold switch in what follows. Connected to the output of the third threshold switch 26, is the input of the amplifier 19, through the AND gate 33, which controls the pressure reducing valve 20 as in the first embodiment. The input of the switching stage 28 is connected with the output of the vehicle velocity simulating stage. The circuit details of the stages 24, 25 and 26 are shown in FIG. 5 and FIG. 5a.

Figure 3:
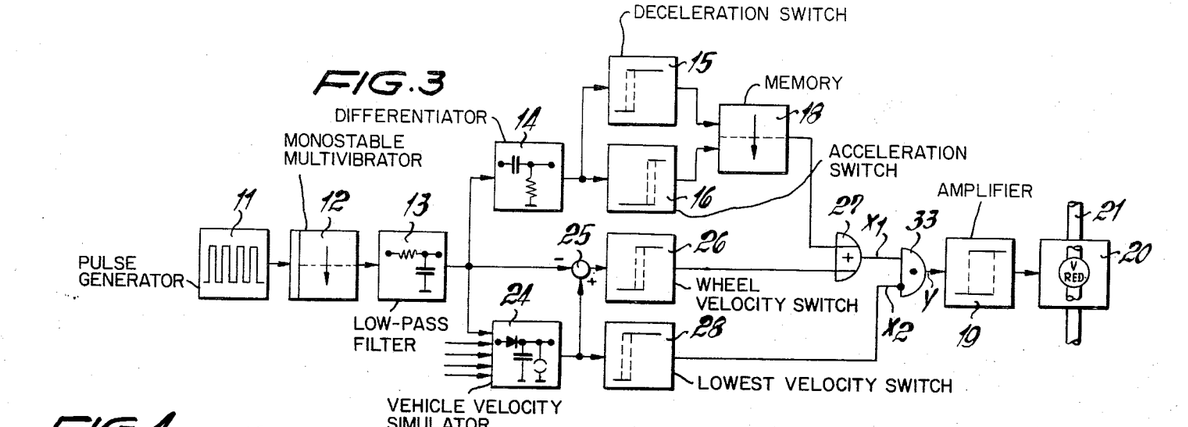
FIG. 3 is a block diagram of a third embodiment of the present invention.

The third embodiment, in accordance with FIG. 3 is a combination of the first two embodiments. Connected to the output of the first low pass filter 13, are as in the first embodiment, the differentiator 14, the two threshold switches 15 and 16, as well as the memory or storage stage 18. Also connected to the output of the low pass filter 13 are, as in the second embodiment, the first input of the subtracting stage 25 and an input of the motor vehicle velocity simulating stage 24. In contrast to the first embodiment, no second low pass filter 17 is provided. This low pass filter 17 is replaced through the circuit of the second embodiment, as described further below.

In the third embodiment, th outputs of the memory stage 18 and the third threshold switch 26 are connected to the first input of the AND gate 33, by way of an OR gate 27. The output of the switching stage 28 is connected with the second input of the AND gate 33. The input of the switching stage 28 is connected, as in the second embodiment to the output of the vehicle velocity simulating stage 24.

The output of the AND gate 33 is connected with the input of the amplifier 19 which controls the pressure reducing valve 20, as in the first two embodiments.

FIG. 4 shows circuit details relevant to the components of the first embodiment. The differentiator 14 includes an operational amplifier 140 having an inverted input to which a differentiating capacitor 141 is connected. The output of the operational amplifier 140 is galvanically connected to the inverted input, through a feedback resistor 146. For the purpose of supressing steep voltage spikes, a limiting resistor 142 and a smoothing capacitor 147 are provided. The non-inverted input of the operational amplifier 140 is connected, through a resistor 145, to the tap of a voltage divider consisting of resistors 143 and 144. As a result, the non-inverted input of the operational amplifier 140 is at constant potential.

Connected to the output of the differentiator 14 are two threshold switches 15 and 16a which are constructed in the form of Schmitt-trigger circuits including operational amplifiers 150 and 160. In each of the two operational amplifiers 150 and 160 the output is galvanically coupled to the non-inverted input, through feedback resistors 151 and 161, respectively. In the first threshold switch 15, the inverted input of the operational amplifier 150 is connected to a voltage divider consisting of resistors 153 and 154, so that this invention to the operational amplifier 150 is at constant potential. The non-inverted input of the operational amplifier 150 has applied to it the output voltage of the differentiator 14, through a resistor 152.

The output voltage of the differentiator 14 is, however, connected to the inverted input of the operational amplifier 160, through a resistor 163, in the threshold switch 16a. The non-inverted input of the operational amplifier 160 is connected to the output of an operational amplifier 170, through a resistor 162. The operational amplifier 170 serves as the active component for the second low pass filter 17.

The inverted input of the operational amplifier 170 is connected to the output of the differentiator 14, through a series circuit of two resistors 174 and 175. The output of the operational amplifier 170 is connected, through a capacitor 176 directly to the inverted input. At the same time, the output of the operational amplifier 170 is also connected galvanically, through a resistor 173 to the junction of two resistors 174 and 175. The non-inverted input of the operational amplifier 170 has constant potential applied to it, since this non-inverted input is connected to the tap of a voltage divider consisting of resistors 172 and 171. For the purpose of supressing signals with high frequency, a capacitor 177 is provided between the non-inverted input of the operational amplifier 170 and the junction of resistors 174 and 175.

The outputs of the two threshold switches 15 and 16a are each connected through a differentiating input circuit 29, to two inputs of the memory stage 18. The differentiating input circuit 29 consists of a series circuit having a resistor 292, 293, a capacitor 290, 291 and a diode 294, 295. A further diode 297, 296 is connected between the negative voltage supply line 32 and the junction of the capacitor 290, 291 and the diode 294, 295, respectively.

The memory stage 18 is constructed in the form of a monostable switching stage having two transistors 180 and 181. The emitters of these transistors are directly connected to the negative voltage supply line 32, while their collectors are connected to the positive voltage supply line 31, through resistors 182 and 183, respectively. The collector of the second transistor 181 is galvanically coupled, through a resistor 185 to the base of the first transistor 180. At the same time the collector of the first transistor 180 is capacitively coupled to the base of the second transistor 181, through a series circuit including a capacitor 188 and a diode 187. A resistor 184 is connected between the base of the first transistor 180 and the negative voltage supply line 32, whereas a second resistor 186 is connected between the positive voltage supply line 31 and the junction of the capacitor 188 and the diode 187.

FIGS. 5 and 5a show the circuit details of the important components relevant to the second embodiment. The first low pass filter 13 which is also used in the other two embodiments includes no operational amplifier in conjunction with the second low pass filter 17, in contrast to what has been already described. Instead, two transistors 130 and 131 are provided. The base of the first transistor 130, which is of the pnp conductivity type, receives its input voltage through a series circuit including two resistors 132. The emitter of the pnp transistor 130 is connected, through a series circuit of two resistors 133 to the base of the second transistor 131 which is in the form of an npn transistor. The emitter of the first transistor 130 is, furthermore, connected with the positive voltage supply line 31 through a resistor 137, while the emitter of the second transistor 131 is connected, through a resistor 136, to the negative voltage supply line 32. The emitter of the first transistor 130 is, moreover capacitively coupled to the junction of the two resistors 132, by a capacitor 134. The emitter of the second transistor 131 is, similarly, connected to the junction of the two resistors 133, to a capacitor 135. The base electrodes of the two transistors 130 and 131 are, furthermore, connected with the negative voltage supply line 32, through capacitors 138 and 139, respectively.

Figure 5B:
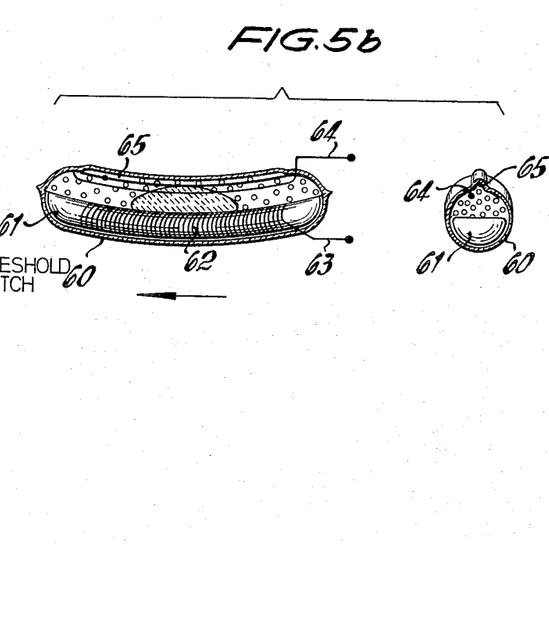
FIG. 5b shows the constructional details of an acceloremeter used in conjunction with the circuit of FIG. 5.

In the second embodiment, the output of the first low pass filter 13, namely the emitter of the second transistor 131 is connected to the input of the vehicle velocity simulating stage 24. This velocity simulating stage 24 includes an impedance converter, on the one hand, which is constructed of a transistor 240 with an emitter resistor 242. For further supression of high frequency signals, a capacitor 247 is provided between the base of the transistor 240 and the negative voltage supply line 32. Connected to the emitter of the transistor 240 is a first electrode of a capacitor 246 through a diode 245. The second electrode of the capacitor 246 is connected with the negative voltage supply line 32. A terminal 248 is connected with the junction between the diode 245 and the capacitor 246, and further impedance converters are connected to this terminal 248. These additional impedance converters belong to the blocking protection arrangement of other wheels of the same vehicle. The collector of an npn transistor 241 is, moreover, connected to the junction between the diode 245 and the capacitor 246. The emitter of the transistor 241 is directly connected to the negative voltage supply line 32, and the base of this transistor 241 is connected to the tap of a voltage divider consisting of resistors 243 and 244. This transistor 241 serves as a source of constant current for discharging the capacitor 246. The resistor 244 has a variable resistance value and is shown in FIG. 5b.

The voltage across the capacitor 246 and the output voltage of the first low pass filter 13 are applied to two inputs of the differentiating stage 25. This differentiating stage 25 has two summing resistors 255 and 256 which form the inputs, at the same time. An inverting stage is connected in front of the first summing resistor 255, and this inverting stage includes an operational amplifier 250. The non-inverted input of the operational amplifier 250 is connected to the tap of a voltage divider consisting of two resistors 251 and 252. The inverted input of the operational amplifier 250 is connected, through a resistor 253, to the junction between the diode 245 and the capacitor 246 in the velocity simulating stage 24. The output of the operational amplifier 250 is coupled to the inverted input of this amplifier, through a resistor 254.

The voltage summation at the junction between the two resistors 255 and 256, is applied to a third threshold switch 26 which does not include an operational amplifier, as do the threshold switching circuits of the first embodiment. Instead, this third threshold switch 26 includes two transistors 260 and 261. The first transistor 260 is of the npn type, and its collector is connected to the positive voltage supply line 31, through two series connected resistors 262. The base of the second transistor 261 is connected to the junction of these two resistors 262. This second transistor 261 is of the npn conductivity type, and its emitter is directly connected to the positive voltage supply line 31. The collector of the second transistor 261 is connected to the negative voltage supply line 32, through a resistor 263. Aside from this, the collector of the second transistor 261 is coupled, through a resistor 264, galvanically to the base of the first transistor 260. The emitter of the first transistor 260 is connected to the sliding contact of a trimming potentiometer 265 having an AND terminal directly connected to the negative voltage supply line 32. The other terminal of this potentiometer is connected to the positive voltage supply line 31, through two series-connected diodes 266. The base of the first transistor 260 is connected to a resistor 267.

Connected to the output of the third threshold switch 26, namely the collector of the second transistor 261, is an inverting stage, through a resistor 268a. The inverting stage has a transistor 268 with a collector resistor 268b.

FIG. 5a shows a modification of the subtracting stage 25, whereby a series circuit is connected between the output of the operational amplifier 250 and the positive voltage supply line. This series circuit includes a trimming potentiometer 259 and a resistor 259a. Connected to the sliding contact of this trimming potentiometer 259 is an emitter-follower which consists of a transistor 257 with an emitter resistor 258. The emitter of the transistor 257 is connected to the first summing resistor 255. The remaining components are identical with those in FIG. 5, which are represented by identical reference numerals.

FIG. 5b shows the mechanical construction for the variable transistor 244, and this construction is shown in longitudinal and transverse views. A curved glass tube 60 contains a resistance wire on its lower side, and this resistance wire is wound upon a spool 61. A mercury drop 56 can move on top of this wound resistor. This mercury drop contacts the upper surface of the glass tube. One end of the wire resistor 62 is led to the exterior through a terminal 63. A wire 64 runs parallel to the upper edge of the glass tube 60, and forms the other terminal of the resistor. The contact between the wire 63 and the resistor 62 is closed through the mercury drop 66. The glass tube 60 is filled with a protective gas as, for example, argon, or nitrogen, and has a bulging portion 65 on its upper edge. In view of capillary action, the mercury cannot penetrate this bulging portion, while the protective gas streams therein. Since the bulging portion has a relatively small cross section, this bulging portion functions as a streaming resistance for the protective gas and dampens thereby the oscillation of the mercury drop 66.

FIG. 6 shows the circuit details of the amplifier 19, the AND gate 33, the OR gate 27 and the switching stage 28, as they are used in the third embodiment, in accordance with FIG. 3. The switching stage 28 includes a threshold switch which is constructed in the form of a Schmitt-trigger circuit having two transistors 280 and 281. The first transistor 280 is of the pnp conductivity type. The emitter of this transistor 280 is connected to a voltage divider which consists of a trimming potentiometer 284a and a resistor 284b. This voltage divider is connected between the positive voltage supply line 31 and the negative voltage supply line 32. The collector of the transistor 280 leads to the negative voltage supply line 32 through two resistors 283a and 283b. The base of the second transistor 281 is connected to the junction of these two resistors 283a and 283b. The collector of the second transistor 281, furthermore, is connected on one hand to the base of the transistor 280 through a resistor 285. This collector of transistor 281 is also connected, on the other hand, via a resistor 286, to the positive voltage supply line 31. At the same time, the collector of transistor 281 is moreover connected to the output of the switching stage 28 through the series circuit including resistor 287 and diode 288.

The switching stage 28 includes in both of its input lines, two input resistors 280a and 282a. The first resistor 280a is connected with the base of the first transistor 280. The second resistor 282a connects the input terminal 30 with the base of the third transistor 282. The collector of this latter transistor is connected, through a resistor 282b with the positive voltage supply line 31. At the same time, this collector of transistor 282 is connected with the output of the switching stage 28, through a diode 289.

A common npn transistor 270 is provided for the OR gate 27 and the AND gate 33. The base and collector electrodes of the transistor 270 form both of its inputs. The base of this transistor has, thereby a resistor 271 connected to it. This resistor 271 is also connected to the output of the switching stage 28. The function of the OR gate 27 is achieved through two diodes 272 and 273 having their cathodes connected to the collector of the transistor 270. The anode of the first diode 272 is connected to the output of the third threshold switching circuit 26, whereas the anode of the second diode 273 is connected to the output of the memory stage 18.

The amplifier 19 includes at its input, an npn transistor 190 which is connected as an emitter-follower. The collector of transistor 190 is connected to the positive voltage supply line 31, whereas the emitter of this transistor is connected, through a resistor 194, to the minus voltage supply line 32. The base of the transistor 190 is connected to the collector of the transistor 270, as well as to the negative voltage supply line 32 through a resistor 196. The amplifier 19 has a Darlington circuit in its power section, and this Darlington circuit includes a preamplifying transistor 191 and a power amplifier 192. A resistor 194 is connected between the emitter of the transistor 190 and the base of the preamplifying transistor 191. The collector electrodes of the two transistors 191 and 192 are connected to one end of a control winding 193. The other end of this control winding is connected to the positive voltage supply line 31. The control winding 193 actuates the pressure reducing valve 20.

FIGS. 7 to 10 show diagrams for explaining the functional operation of the individual embodiments. An ideal braking procedure is assumed in conjunction with these diagrams, whereby the situation in the street does not change during the braking action. Furthermore, in this ideal braking procedure the vehicle velocity v, in accordance with curve 50, decreases linearly in relation to time. It is also assumed here that the braking action is so severe that the blocking protection arrangement becomes activated. The curves 51 to 55 show the wheel surface velocity as a function of time, and as a function of different types of control circuits that may be used for the blocking protection arrangement. The brake becomes actuated at the time instant $t_o$, and the oscillations that take place in the first time interval between $t_o$ and $t_1$ are not taken into account in curves 51–55.

The curve 51 shows the function of the wheel surface velocity when using a conventional control circuit and when the street condition is satisfactory. In contrast thereto, curve 52 shows the function of the wheel surface velocity in relation to time, when braking action takes place on a very smooth street. It may be seen from this, that when using a conventional control circuit the wheel is blocked prematurely. The curves 53, 54 and 55 show the wheel surface velocity as a function of time, when the control circuit of FIGS. 1, 2 and 3 are used.

The functional operation of a simplified control circuit, in accordance with FIG. 1 is described next below. The simplification resides on the basis that no second low pass filter 17 is provided. Such a simplified control circuit is not identical in construction with the conventional control circuits, but its functional operation is, nevertheless, substantially the same as such conventional control circuits. Thus, the curves in accordance with FIG. 7 result in a braking procedure, and these show the wheel surface velocity as a function of time.

Figure 7:
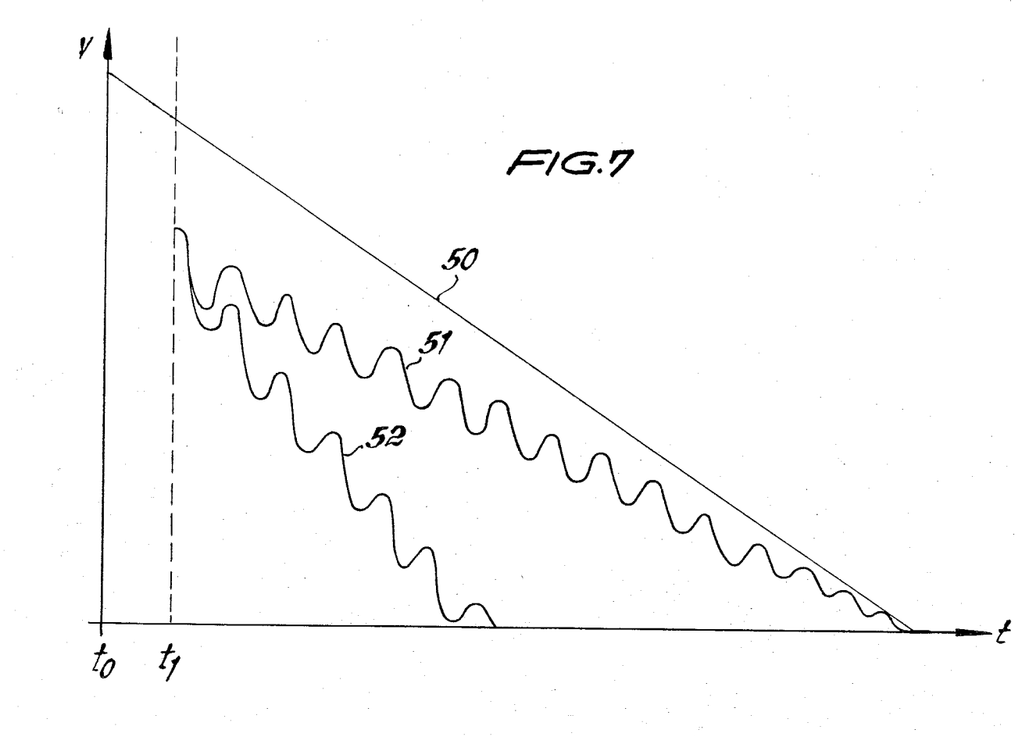
FIG. 7 is a waveform diagram describing the operation of conventional arrangements for protecting against blocking of wheels in a vehicle.

In the following explanation of the functional operation, the circuit details in accordance with FIGS. 4, 5 and 6 are taken into account in addition to those of FIGS. 1 and 7. When driving with constant velocity, the monostable multivibrator stage 12 provides at its output rectangular-shaped pulses having a constant pulse repetition frequency. The low pass filter 13 (see FIG.

5) filters the rectangular-shaped signal with the aid of capacitors 134, 135, 138 and 139. This low pass filter 13 provides a DC voltage at the emitter-resistor 136 which has a magnitude proportional to the pulse repetition frequency of the rectangular-shaped pulses. The operational amplifier 140 within the differentiator 14 (see FIG. 4) is coupled to this constant DC voltage, so that the output of the operational amplifier 140 is at constant potential having a magnitude which is determined through the input voltage divider of the non-inverted input.

When, now, braking action is suddenly applied, the output voltage of the first low pass filter 13 decreases. The output voltage of the differentiator 14 shifts, thereby, in the positive direction, since the differentiating capacitor 141 is connected to the inverted input of the operational amplifier 140. The first threshold switch 15 responds to positive variations in the output voltage of the differentiator 14. When the wheel begins to skid on the street due to braking action which was applied too severely, considerable wheel deceleration is incurred, so that the output potential of the differentiator 14 is shifted strongly in the positive direction. As soon as the output potential of the differentiator 14 exceeds the level of the input potential of the inverted input of the operational amplifier 150 which is determined by the voltage divider 150, 154, then the output potential of the operational amplifier 150 shifts in a stepwise manner in the positive direction. The positive voltage step is applied to the base of the transistor 180 of the memory stage 18, through the resistor 292, the capacitor 290 and the diode 294 in the differentiating input circuit 29, shown in FIG. 4. As a result, the transistor 180 becomes conductive and transmits a negative step voltage to the base of the second transistor 181, from its collector and through the capacitor 188 and diode 187. The transistor 181 becomes thereby turned off, and its collector is substantially at positive potential.

With this arrangement, all three transistors in the amplifier 19, in accordance with FIG. 6, become conductive, and the pressure reducing valve 20 becomes opened with the aid of the control winding 190. The braking pressure, consequently, is reduced and the brake is released. The functional operation of the switching stage 28, is, thereby out of consideration. The functional operation of this switching stage 28 will be explained in detail with respect to the third embodiment.

As soon as the brake is loosened, the wheel becomes again accelerated as a result of rubbing against the upper surface on the street or highway. As a result, the output potential of the differentiator 140 shifts in the negative direction. As soon now that the non-inverted input of the operational amplifier 160 within the second threshold circuit 16 is held at constant potential through a voltage divider. The output potential of the operational amplifier 160, will then jump in the positive direction, as soon as the output potential of the operational amplifier 140 within the differentiating circuit 14 is below this voltage of the non-inverted input of the operational amplifier 160. Through an adjustable positive acceleration parameter, consequently, a positive step voltage is applied to the base of the transistor 181 in the memory stage 18, through the resistor 293, capacitor 291 and the diode 295. As a result, the positive step voltage causes the transistor 181 to again conduct.

The collector potential of transistor 181 becomes thereby substantially equal to the potential of the negative voltage supply line, and the transistors within the amplifier 19 become turned off, so that the pressure reducing valve becomes again closed. The brake is consequently again applied, and the entire cycle is repeated periodically, as may be seen from curve 51 in FIG. 7.

The process steps as described become executed however, only when the street surface possesses substantial gripping surface characteristics. Under ice conditions or when the street is wet, the wheel becomes braked so severely after only a few cycles, that it becomes stopped, as shown by curve 52 in FIG. 7. As soon as the wheel becomes stationary or stopped, no information is further available from the pulse generator 11, and the pressure reducing valve retains its open position, until the expiration of the time interval associated with the monostable switching stage which serves as the memory 18. After the expiration of this time interval of approximately 0.2 seconds, the wheel is held stationary or blocked in any case.

This disadvantage whereby the pressure reducing valve is held continuously closed and the wheel remains thereby blocked, can be avoided by resorting to the three embodiments, as explained below. In the first embodiment, the threshold level of the second threshold switch 16a is shifted only in positive direction dependent upon the average wheel delay. The second low pass filter 17 is used for this purpose with the output of this low pass filter 17 connected to the non-inverted input of the second threshold 16a. When the wheel, in accordance with the curve 52 in FIG. 7 is too severely braked, then the output voltage of this differentiator 14, when averaged over time, is clearly above the value which is assumed when the vehicle driving speed is constant. With a time delay determined through the frequency limit of the second low pass filter, the applied voltage to the non-inverted input of the operational amplifier 160 decreases, since the output voltage of the differentiator 14 is applied to the inverted input of the operational amplifier 170. This has the significance that the second threshold switch 16a becomes first responsive when larger positive accelerations prevail.

Figure 8:
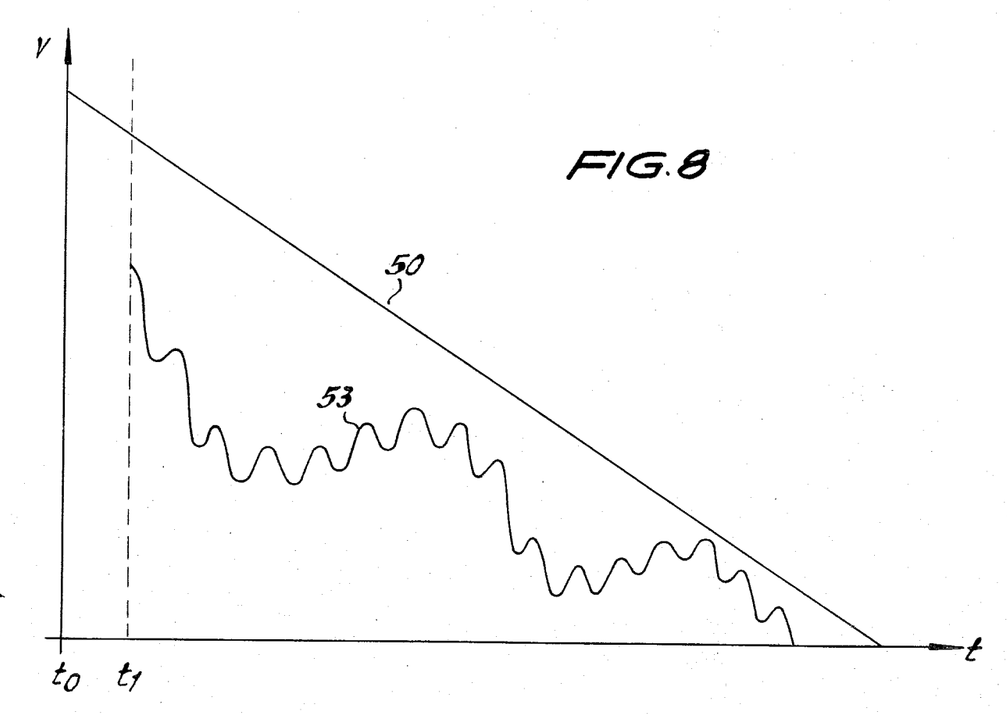
FIG. 8 is a waveform diagram describing the operation of the first embodiment.
Figure 9:
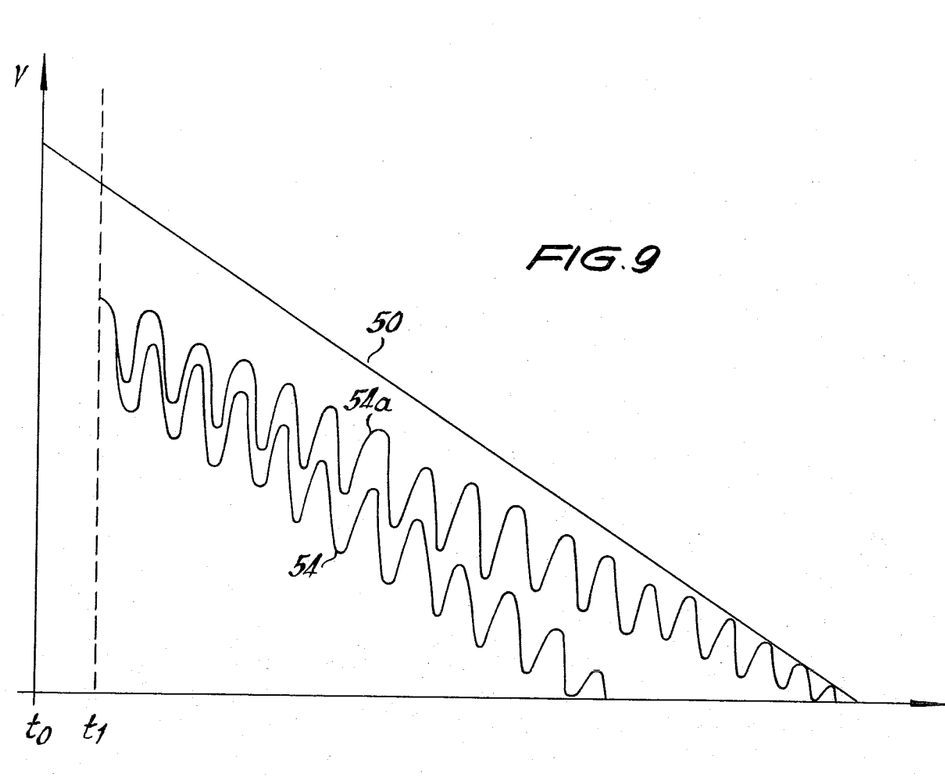
FIG. 9 is a waveform diagram describing the operation of the second embodiment of the present invention.

The function and characteristic of the curve 53 in FIG. 8 presents this clearly. The regulation processes of the blocking protection arrangement take place normally at a frequency of substantially 10 Hz. In contrast to this, the second low pass filter 17 has a frequency limit of substantially 2 Hz. In view of smooth street surface upon which the vehicle is to be driven, the wheel becomes very strongly delayed. The second low pass filter 17 sets the threshold level of the second threshold switch 16a so that in what follows a small rise of the average wheel surface speed is obtained. The second low pass filter 17 responds thereto, and sets the threshold level of the second threshold switch 16a again in positive direction, so that the wheel delay is then increased. This described process repeats itself then again.

The second embodiment in accordance with FIG. 2, achieves substantially the same action with the aid of a somewhat modified circuit. The circuit changes are based essentially on the difference between the vehicle velocity and the surface velocity of the individual wheels, as measured. The pressure reducing valve 20 becomes then opened when this difference in velocities exceeds a predetermined limit.

The velocity of the vehicle should in principle be measured with a fifth wheel which is not braked. This, however, cannot be carried out with the usual type of motor vehicle. The vehicle velocity simulation stage 24 makes possible to substantially approximate the velocity of the vehicle, without resorting to a fifth wheel. Each wheel of the vehicle is equipped with a pulse generator 11, a monostable switching stage 12, and a first low pass filter 13. As already described above, the transistor 141 conducts increasingly in the first low pass filter with increase in the speed of the wheel. The voltage drop at the emitter resistor 136, is, thereby, approximately proportional to the wheel's rotational speed. At the input of the vehicle velocity simulation stage 24, is a built-in impedance converter 240. When the angular speed of the wheel increases, transistor 240 becomes less conductive, and its emitter potential becomes thereby increased, since the voltage drop across the emitter resistor 242 increases. The capacitor 246 becomes charged to a voltage through the emitter resistor 242 and the diode 245, which is essentially proportional to the angular speed of the wheel. Such an emitter-follower 240, 242 is provided for each wheel of the vehicle, and these emitter-followers are connected to the input terminal 248.

Since the regulating processes in the blocking protection arrangement for the individual wheels do not take place synchronously, it can be assumed that the surface velocity of at least one wheel is substantially always equal to the vehicle velocity. Simultaneous blocking of all wheels is considerably improbable. However, even for this improbable case, provision is made in the circuit of FIG. 5 with the aid of the variable resistor in accordance with FIG. 5b. When one wheel is blocked or stopped, the emitter potential of the transistor 240 acquires substantially the potential of the minus voltage supply line 32. The capacitor 246, can, however, not discharge through the transistor 240, in view of the diode 246. In order that the capacitor not retain its voltage upon blocking of the wheel or upon uniform braking of all four wheels, the constant current source 241, 243, 244 is provided.

Through the use of a simplified circuit with a fixed resistor 244 a current magnitude is set which corresponds to a vehicle deceleration of 10 m/sec.². Such deceleration can also be referred to as a delaying action. The preceding deceleration value is the maximum braking deceleration which may be attained on a dry street or driving surface. It is possible to achieve thereby, that the charging voltage for the capacitor 246 decreases, when all wheels are blocked or stopped.

With this simplified circuit, however, it is possible to obtain a velocity parameter in the vehicle velocity simulation stage 24, which decreases too rapidly in the case when the wheels are blocked. This error can be corrected by using an accelerometer. A particularly simple accelerometer is shown in FIG. 5b. The glass tube 60 in which the resistor 244 is contained, is secured to the vehicle chassis, in a horizontal position. The vehicle direction is indicated through an arrow. When the vehicle becomes decelerated, the mercury drop rolls slowly towards the front, so that the mercury drop moves further towards the front the greater the deceleration. The resistor between the output terminal 63 and 64 acquires, thereby, increasing resistance which is substantially proportional to the braking deceleration or braking delay. It is achieved, thereby, that the discharge current in the constant current source 241, 242, 244 increases with increase in the deceleration of the vehicle. When all wheels are blocked or locked, these velocity variations become integrated by the capacitor 246, and the capacitor acquires thereby a voltage which is proportional to the velocity which is actually attained. It is thereby also possible to determine precisely the difference velocity in the difference stage 25.

To determine the difference between the velocity of the vehicle and the surface velocity of the wheels, the difference stage 25 is used. It is possible to obtain the difference stage 25 from a summing stage, when an inverting stage with an operational amplifier 250 is connected in front of one of the inputs of the summing stage. At the junction between the two summing resistors 255 and 256 is a voltage which is proportional to the difference between the surface velocity of the wheel and the vehicle velocity. This condition, however, requires that the amplification factor of the operational amplifier 250 is equal to unity. As soon as the difference exceeds a predetermined limit, the third threshold switching circuit 26 actuates the pressure reducing valve. The third threshold switching circuit 26 is constructed in the form of a Schmitt-trigger circuit with an adjustable threshold level and with temperature compensation. The threshold level can be adjusted or set with the aid of the trimming potentiometer 265. The temperature function of the emitter-base diode of the transistor 260 would influence this threshold level. Accordingly, two diodes 266 are provided which exhibit equal temperature response. Two diodes are thereby required, since the emitter of the transistor 260 is connected to the sliding contact of the trimming potentiometer 265.

The third threshold switch 26 is set so that the two transistors 260 and 261 conduct when the surface velocity of the individual wheels of the vehicle is substantially equal to the velocity of the vehicle. When, now, the wheel is suddenly severely decelerated or braked, then the output voltage of the first low pass filter 13 decreases. The input potential of the third threshold switching circuit 26 also decreases through the summing resistor 256. As a result, the two resistors 260 and 261 are turned off. The collector of the transistor 261 acquires thereby, substantially negative potential. This collector is connected to the input of the amplifier 19, through the inverting stage 268, 268a, 268b. When a predetermined velocity difference is exceeded, the pressure reducing valve becomes, consequently, opened. The predetermined velocity difference can be set through the trimming potentiometer 265. Since the regulating circuit has a relatively large time constant, the pressure reducing valve becomes again closed fully after the velocity difference has become essentially smaller.

For example, it is possible to set the threshold level of the third threshold switching circuit 26, with the aid of the trimming potentiometer 265, so that the pressure reducing valve 20 becomes opened when a velocity difference of substantially 16 km/h prevails. With such a setting of the control circuit, the wheel is already stopped when the vehicle still has a velocity of 16 km/h. Upon stand-still of the wheel, the sidewise applied force becomes zero, so that dangerous situations are still possible on smooth icy surfaces. With the circuit variation in accordance with FIG. 5a, it is possible to apply the characteristic of curve 54a to the second embodiment. This characteristic corresponds substantially to regulation with constant slip in accordance with curve 51. The inverting stage with the operational amplifier 250 is designed, as in the circuit of FIG. 5, so that an amplification factor of unity is precisely obtained. The two resistors 253 and 254 must, for this purpose have precisely the same resistance values. In the circuit of FIG. 5a, the entire output voltage of the operational amplifier 250 is not applied to the first summing resistor 255. Instead, only a fraction of this voltage is applied through the trimming potentiometer 259. In view of this feature, the third threshold switching circuit 26 becomes actuated when the wheel velocity as measured with the first low pass filter 13, is substantially equal to the set fraction of the vehicle velocity. Regulation with constant slip is, thereby, achieved. With constant slip, constant relative deviation of the wheel surface velocity with respect to the vehicle velocity is obtained.

The second embodiment has a simpler circuit than the other two embodiments, and offers nevertheless the possibility of varying the circuit characteristics between wide limits, with the aid of the two trimming potentiometers 259 and 265. The pressure reducing valve becomes then opened for the first time when the set velocity difference of, for example, 16 km/h is attained. It is particularly possible to sense the feature that the blocking protection arrangement responds in a recoil manner, when severe braking takes place on a dry driving surface. In contrast to this, the control circuit of FIG. 1 responds considerably softer or easier, since it already reacts to the deceleration of the wheel, and does not wait until a higher velocity difference is first attained.

Figure 10:
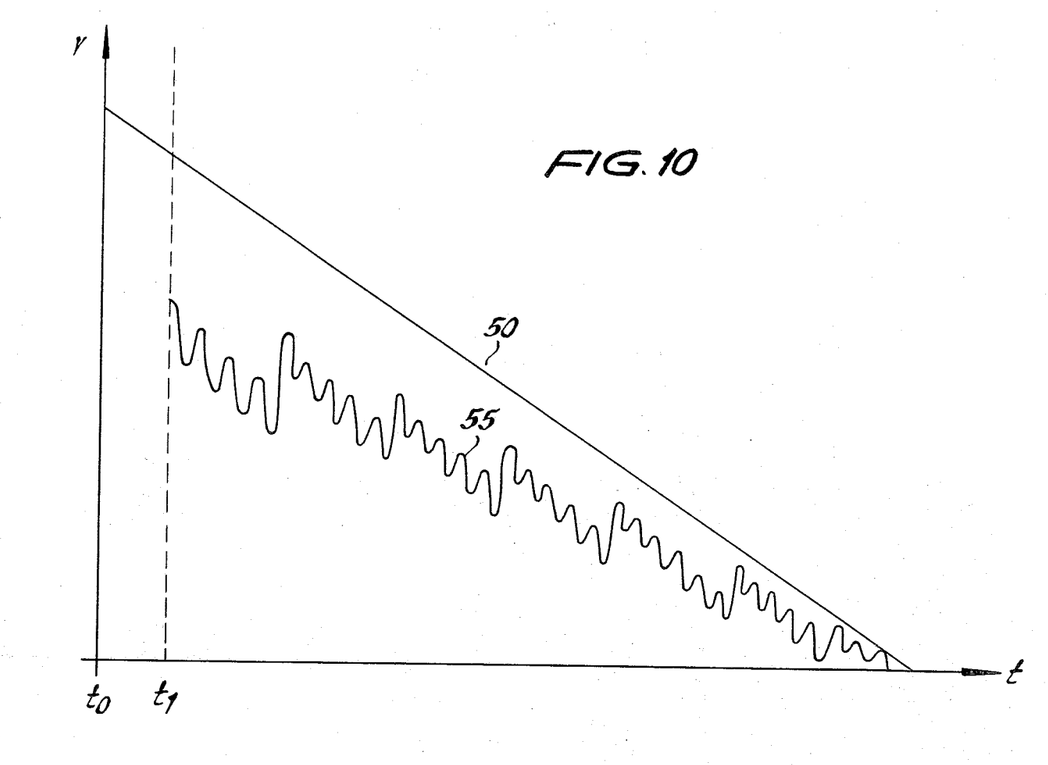
FIG. 10 is a waveform diagram describing the operation of the third embodiment of the present invention.

The third embodiment in accordance with FIG. 3 combines the particular advantage of the first embodiment namely the soft response with the particular advantage of the second embodiment corresponding to precise setting of the circuit characteristic. Only the two circuits of FIGS. 1 and 2 are connected in parallel to the output of the first low pass filter 13, and the outputs of these two circuits are coupled to the input of the circuit amplifier 19, through the OR gate 27. The outputs of these two circuits of FIGS. 1 and 2 correspond to the outputs of the memory stage 18 and the third threshold switching circuit 26. The individual components are selected so that under normal operating conditions, corresponding to severe braking on a dry driving surface, only the circuit of the first embodiment becomes operative. Thus, only the stages 14, 15, 16 and 18 become operative under such severe braking conditions on a dry driving surface. With this arrangement, soft or easy response action of the blocking protection arrangement is obtained, and a characteristic in accordance with the curve 51 in FIG. 7 is achieved. This results from the condition that the second low pass filter 17 is omitted. Upon severe braking on a smooth driving surface, whereby the curve 52 of FIG. 7 prevails, the circuit of the second embodiment with the stages 24, 25 and 26 becomes operative. Furthermore, this circuit of the second embodiment becomes operative when the set velocity difference is exceeded. With such braking action, the characteristic of the curve 55 of FIG. 10 is, for example, obtained for the wheel surface velocity. The sinusoidal curve is here not superimposed with another sinusoidal curve, as is the case in the first embodiment. Instead, a saw-tooth function is superimposed on the curve. Through a unique setting of the trimming potentiometer 259, it is also here possible to make the central rise of the curve 55 lower than that for the curve 50, as shown in conjunction with the second embodiment and the curve 54a.

The circuit stage 28 and the AND gate 33 are provided for the purpose of further fulfilling the conditions of the control circuit. These two stages 28 and 33 are used in all three embodiments. The circuit stage 28 includes a threshold switching circuit with the transistors 280 and 281. This threshold switching circuit inhibits opening of the pressure reducing valve 20, when below a predetermined vehicle velocity of, for example 5 km/h. In order that the pressure reducing valve can be opened, it is necessary that the transistor 270 in the AND gate 33 becomes turned off. This is only possible when the transistor 282 first conducts upon closed brake light switch. Furthermore, this feature is also only possible when the transistor 281 conducts within the threshold switch circuit. When one of these two conditions is not fulfilled, the pressure reducing valve 20 cannot become opened. There are two reasons for requiring the installation of the circuit stage 28: when driving through holes or cavities in the road surface, accelerations and decelerations are applied to the individual wheels, when no braking action is applied. In this case, the pressure reducing valve should not respond to such road surface conditions. When very low vehicle velocities prevail, the pulse generator 11 provides pulses which can no longer be sufficiently damped, as a result of their low frequency from the first low pass filter 13. At the output of the first low pass filter 13, thereby, a constant DC voltage no longer prevails, when the vehicle drives with constant velocity. Instead, a pulsing DC voltage appears. The pressure reducing valve 20 would, under these circumstances, become periodically opened and closed in accordance with the pulse repetition frequency. This condition is prevented in that the lower output voltage of the vehicle velocity simulation stage 24, the two transistors 280, and 281 of the threshold switching circuit both conduct. In the first and second embodiments, the base of the transistor 280 must be connected to the output of the first low pass filter 13.

It will be understood that each of the elements described above, or two or more together, may also find a useful application in other types of control arrangement for the protection against wheel locking in motor vehicles, differing from the types described above.

While the invention has been illustrated and described as embodied in a control arrangement for the protection against wheel locking in motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An anti-skid arrangement for a vehicle having a first wheel and additional wheels and brake means for said first wheel, comprising, in combination, brake-release means comprising an electrically actuated valve and amplifying means including a power-transistor stage having an output connected to said valve for controlling energization of the latter and having an input for receiving actuating signals; an OR-gate having an output connected to said input of said brake-release means and having a first input and a second input; triggerable memory means having a first state and a second state and having two inputs and having an output connected to said first input of said OR-gate and operative when triggered into said first state for furnishing an actuating signal to said input of said brake-release means; signal generating means for generating a voltage proportional to the rotational speeds of said first, wheel, and including A.C. generator means synchronized with rotation of said first wheel and operative for generating an alternating current voltage having a frequency proportional to the speed of said first wheel, and low-pass filter means connected to the output of said signal generating means and operative for converting said alternating current voltage into a direct current speed signal having a magnitude varying in proportion to the speed of said first wheel; differentiating means operative for differentiating said speed signal to produce an acceleration voltage proportional to the acceleration of said first wheel; deceleration monitoring means comprising a first threshold switch having an output connected to said first input of said memory means and having an input connected to the output of said differentiating means and responsive to said acceleration voltage when the latter has a polarity corresponding to wheel deceleration and operative for triggering said memory means to said first state when the magnitude of the wheel deceleration exceeds a predetermined value; acceleration monitoring means comprising a second threshold switch having an output connected to said second input of said memory means and having an input connected to the output of said differentiating means and responsive to said acceleration voltage when the latter has a polarity corresponding to wheel acceleration and operative for triggering said memory means to said second state when the magnitude of the wheel acceleration exceeds a predetermined value; slip-detecting means having an output connected to said second input of said OR-gate and operative for furnishing an actuating signal to said brake-release means when the slip of said first wheel exceeds a predetermined value, said slip-detecting means comprising a vehicle-velocity simulating stage operative for generating a vehicle-velocity signal simulating the speed of travel of the vehicle, comparator means for comparing the speed of travel of the vehicle with the speed of said first wheel to generate a signal representative of the slip of said first wheel and including summing means having a first input connected to the output of said low pass filter means and having a second input connected to the output of said simulating stage to receive said vehicle-velocity signal and having an output at which is furnished a voltage corresponding to the difference between the voltages at the first and second inputs thereof and a third threshold switch having an input connected to said output of said summing means and having an output connected to said input of said power-transistor stage for furnishing to the latter an actuating signal when the voltage at the output of said summing means exceeds a predetermined value; and means including a fourth threshold switch having an input connected to the output of said simulating stage for receipt of said vehicle-velocity signal and having an output connected to said input of said brake-release means and operative for preventing actuation of said brake-release means when said vehicle-velocity signal has a value indicative of a vehicle speed below a predetermined speed.

2. The arrangement defined in claim 1, wherein said memory means comprises a monostable switching stage actuated by said first threshold switch for switching said monostable stage to the non-stable state of said monostable stage, said second threshold switch actuating said monostable stage for causing said monostable stage to revert to the stable stage prior to the time interval associated with said non-stable state.

3. The arrangement defined in claim 1, wherein said summing means comprises two summing resistors.

4. The arrangement defined in claim 3, including inverting means connected to one of said summing resistors.

5. The arrangement defined in claim 1, wherein said vehicle-velocity simulating stage comprises a plurality of additional signal generating means each associated with a respective one of said additional vehicle wheels and each operative for generating a respective additional direct current speed signal having a magnitude varying in proportion to the speed of the respective wheel, and means for generating a signal constituting said vehicle-velocity signal and corresponding to the one of said speed signals corresponding to the fastest-turning one of said first and additional vehicle wheels.

6. The arrangement defined in claim 5, wherein said vehicle-velocity simulating stage further includes integrating capacitor means, and means connected to all of said signal generating means to receive said speed signals and operative for applying to said integrating capacitor means a charging voltage corresponding to the one of said speed signals indicative of the highest wheel velocity, and means connecting said integrating capacitor means to said second input of said summing means for applying to the latter a voltage corresponding to the voltage across said integrating capacitor means.

7. The arrangement defined in claim 6, wherein said vehicle-velocity simulating stage further includes a constant current source connected to said integrating capacitor means for discharging the latter.

8. The arrangement defined in claim 7, wherein said constant current source includes resistor means having a resistance value dependent on the deceleration of said vehicle, the current magnitude of said constant current source increasing with increasing deceleration of said vehicle.

9. The arrangement defined in claim 5, wherein said vehicle-velocity simulating stage further includes integrating capacitor means, and a plurality of impedance converters each having an input connected to a respective one of said signal generating means and each having an output, and means connected to all of the outputs of said impedance converters and operative for applying to said integrating capacitor means a charging voltage corresponding to one of said speed signals indicative of the highest wheel velocity, and means connecting said integrating capacitor means to said second input of said summing means for applying to the latter a voltage corresponding to the voltage across said integrating capacitor means.

10. The arrangement defined in claim 1, further including an AND-gate having an output connected to said input of said brake-release means and having a first input connected to the output of said OR-gate and having a second input, and an inverter connecting said second input to the output of said fourth threshold switch.

* * * * *